US012680810B1

(12) United States Patent
Lu et al.

(10) Patent No.: US 12,680,810 B1
(45) Date of Patent: Jul. 14, 2026

(54) METHOD FOR CALIBRATING SPATIAL POSE AND POSITION OF CHROMATIC CONFOCAL PROBE WITH COMBINED PLANAR AND SPHERICAL CONSTRAINTS

(71) Applicant: Huazhong University of Science and Technology, Wuhan (CN)

(72) Inventors: Wenlong Lu, Wuhan (CN); Junhao Xie, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 0 days.

(21) Appl. No.: 19/309,675

(22) Filed: Aug. 26, 2025

(30) Foreign Application Priority Data

Feb. 11, 2025 (CN) .......................... 202510147925.7

(51) Int. Cl.
*G01B 21/04* (2006.01)
*G01B 11/00* (2006.01)
(52) U.S. Cl.
CPC .......... *G01B 21/042* (2013.01); *G01B 11/005* (2013.01)
(58) Field of Classification Search
CPC ... G01B 21/042; G01B 21/045; G01B 11/005
See application file for complete search history.

(56) References Cited

U.S. PATENT DOCUMENTS

2021/0285758 A1* 9/2021 Uekita .................. G01B 11/04
2023/0243641 A1* 8/2023 Ju ........................ G01B 5/0004
356/601

FOREIGN PATENT DOCUMENTS

CN 105534596 A * 5/2016
JP 2005069775 A * 3/2005

OTHER PUBLICATIONS

Translation of CN-105534596-A May 4, 2016.*
Translation of JP-2005069775-A, Mar. 17, 2005.*

* cited by examiner

*Primary Examiner* — Manuel L Barbee
(74) *Attorney, Agent, or Firm* — Bayramoglu Law Offices LLC

(57) ABSTRACT

A method for calibrating a spatial pose and position of a chromatic confocal probe with combined planar and spherical constraints is provided. The method includes: transforming point information in a contact probe coordinate system into coordinate information in a machine coordinate system, and transforming point information in a chromatic confocal probe coordinate system into the coordinate information in the machine coordinate system; acquiring information of at least two points in each of three planes by using a chromatic confocal probe, and establishing a system of linear equations to solving the system of linear equations to obtain a spatial pose of the chromatic confocal probe; measuring and calculating coordinate information of at least three points on a spherical surface by using the chromatic confocal probe, and establishing an overdetermined system of equations to solve a zero reference position of the chromatic confocal probe.

10 Claims, 6 Drawing Sheets

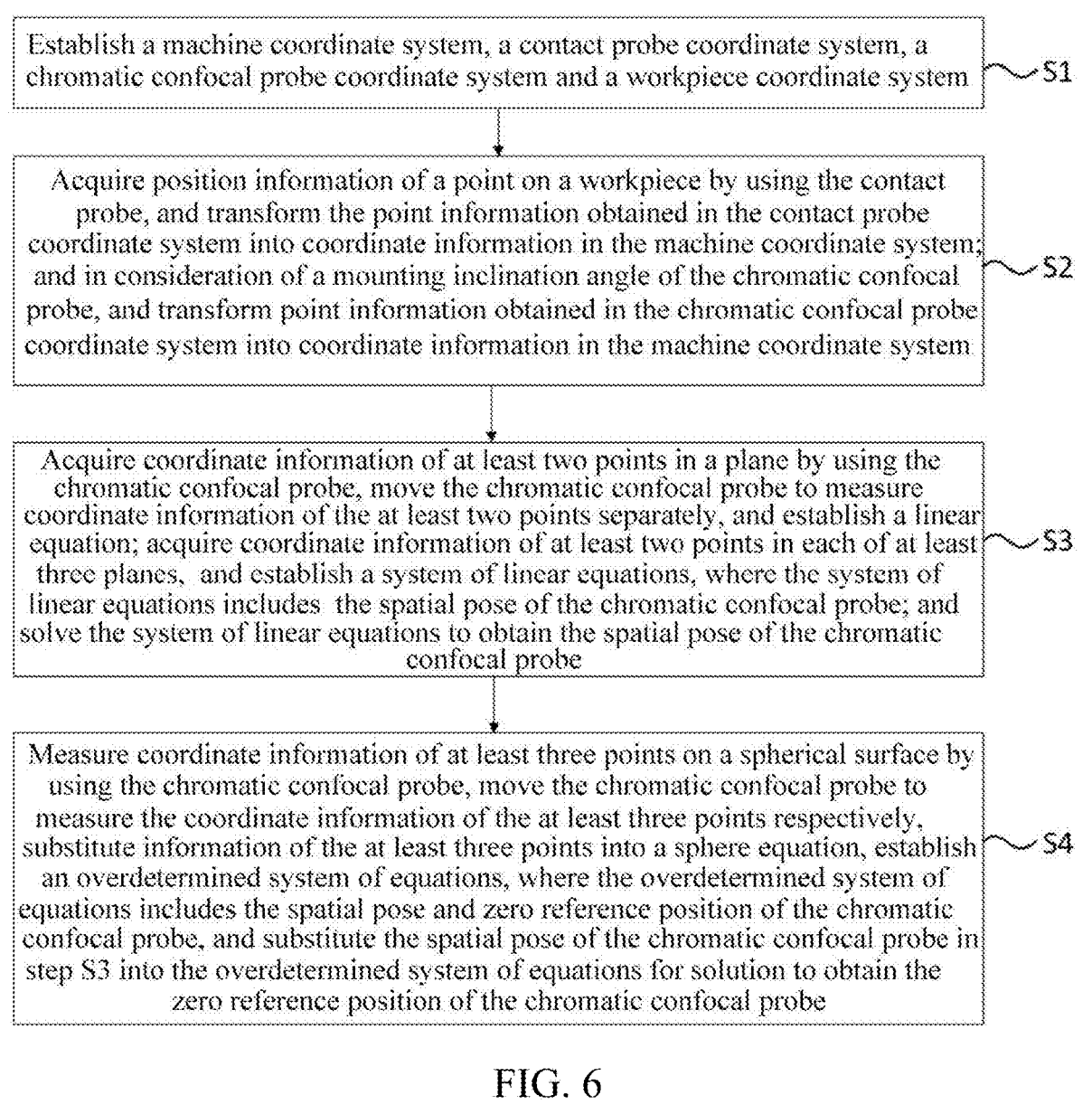

Establish a machine coordinate system, a contact probe coordinate system, a chromatic confocal probe coordinate system and a workpiece coordinate system ~S1

Acquire position information of a point on a workpiece by using the contact probe, and transform the point information obtained in the contact probe coordinate system into coordinate information in the machine coordinate system; and in consideration of a mounting inclination angle of the chromatic confocal probe, and transform point information obtained in the chromatic confocal probe coordinate system into coordinate information in the machine coordinate system ~S2

Acquire coordinate information of at least two points in a plane by using the chromatic confocal probe, move the chromatic confocal probe to measure coordinate information of the at least two points separately, and establish a linear equation; acquire coordinate information of at least two points in each of at least three planes, and establish a system of linear equations, where the system of linear equations includes the spatial pose of the chromatic confocal probe; and solve the system of linear equations to obtain the spatial pose of the chromatic confocal probe ~S3

Measure coordinate information of at least three points on a spherical surface by using the chromatic confocal probe, move the chromatic confocal probe to measure the coordinate information of the at least three points respectively, substitute information of the at least three points into a sphere equation, establish an overdetermined system of equations, where the overdetermined system of equations includes the spatial pose and zero reference position of the chromatic confocal probe, and substitute the spatial pose of the chromatic confocal probe in step S3 into the overdetermined system of equations for solution to obtain the zero reference position of the chromatic confocal probe ~S4

FIG. 6

METHOD FOR CALIBRATING SPATIAL POSE AND POSITION OF CHROMATIC CONFOCAL PROBE WITH COMBINED PLANAR AND SPHERICAL CONSTRAINTS

CROSS-REFERENCE TO THE RELATED APPLICATIONS

This application is based upon and claims priority to Chinese Patent Application No. 202510147925.7, filed on Feb. 11, 2025, the entire contents of which are incorporated herein by reference.

TECHNICAL FIELD

The present disclosure belongs to the technical field of measurement, and in particular relates to a method for calibrating a spatial pose and position of a chromatic confocal probe with combined planar and spherical constraints.

BACKGROUND

A chromatic confocal probe is a high-precision non-contact measuring sensor based on an optical dispersion principle and a confocal technology. A light source for the chromatic confocal probe is a beam broad-spectrum of polychromatic light, which undergoes spectral dispersion to form monochromatic light with different wavelengths after passing through a dispersive lens. The focus of each wavelength corresponds to a characteristic distance value. The measuring light is emitted to a surface of an object and reflected back. Only monochromatic light, which meets the confocal condition and whose focus just falls on the surface of the object, can pass through a small hole to be sensed by a spectrometer. By calculating the wavelength of the sensed light, a distance value from the surface of the object to a sensor can be calculated according to a corresponding relationship between the wavelength and the distance. The chromatic confocal probe itself has the characteristics of high precision, non-contact measurement, strong material adaptability, strong anti-interference ability and fast measurement speed.

In industrial applications, the chromatic confocal probe is usually clamped on a coordinate measuring machine (CMM), and the coordinate measuring machine is used to drive the chromatic confocal probe to move and measure. A traditional off-line coordinate measuring method may have disadvantages such as errors that are likely to be introduced due to repeated clamping of the workpiece and a reduction in processing efficiency. Moreover, the chromatic confocal probe has an inaccurate locating basis when being mounted, which will inevitably lead to eccentricity and inclination angle. These mounting errors will reduce the measurement precision, and the unknown zero-reference position of the chromatic confocal probe will lead to the inability to solve the absolute coordinates of the workpiece in space. Therefore, it is necessary to calibrate the mounting pose and the zero reference position of the chromatic confocal probe.

SUMMARY

Aiming at one or more of the above defects or improvement requirements in the prior art, the present disclosure provides a method for calibrating a spatial pose and position of a chromatic confocal probe with combined planar and spherical constraints, which is used to obtain the spatial pose and the zero reference position of the chromatic confocal probe mounted on the coordinate measuring machine.

In order to achieve the above objective, the present disclosure provides a method for calibrating a spatial pose and position of a chromatic confocal probe with combined planar and spherical constraints, where calibration is carried out by a coordinate measuring machine, a contact probe and a chromatic confocal probe are provided on the coordinate measuring machine, the contact probe is a standard part provided on the coordinate measuring machine, and the contact probe and the chromatic confocal probe are synchronously displaced in a three-dimensional direction; and the method for calibrating the spatial pose and the position of the chromatic confocal probe with the combined planar and spherical constraints includes the following steps:

step S1, establishing a machine coordinate system, a contact probe coordinate system, a chromatic confocal probe coordinate system and a workpiece coordinate system;

step S2, acquiring position information of a point on a workpiece by using the contact probe, and transforming the point information obtained in the contact probe coordinate system into coordinate information in the machine coordinate system; and in consideration of a mounting inclination angle of the chromatic confocal probe, obtaining coordinate information of the point on the workpiece under the chromatic confocal probe, and transforming point information obtained in the chromatic confocal probe coordinate system into coordinate information in the machine coordinate system;

step S3, acquiring coordinate information of at least two points in a plane by using the chromatic confocal probe, moving the chromatic confocal probe to measure coordinate information of the at least two points separately, and establishing a linear equation; acquiring coordinate information of at least two points in each of at least three planes, and establishing a system of linear equations, where the system of linear equations includes the spatial pose of the chromatic confocal probe; and solving the system of linear equations to obtain the spatial pose of the chromatic confocal probe;

step S4, measuring coordinate information of at least three points on a spherical surface by using the chromatic confocal probe, moving the chromatic confocal probe to measure the coordinate information of the at least three points respectively, substituting information of the at least three points into a sphere equation, establishing an overdetermined system of equations, where the overdetermined system of equations includes the spatial pose and zero reference position of the chromatic confocal probe, and substituting the spatial pose of the chromatic confocal probe in step S3 into the overdetermined system of equations for solution to obtain the zero reference position of the chromatic confocal probe.

As an embodiment of the present disclosure, in step S2, the contact probe and the chromatic confocal probe are synchronously displaced, and coordinate information when the contact probe performs measurement is set as a reference value;

the point information on the workpiece measured by the contact probe is substituted into the point on the workpiece measured by the chromatic confocal probe to obtain coordinate information of the point on the workpiece measured by the chromatic confocal probe in the machine coordinate system.

3

As an embodiment of the present disclosure, the coordinate information of the point on the workpiece measured by the chromatic confocal probe in the machine coordinate system in step S2 is acquired as follows:

causing directions of three axes of X, Y and Z in the machine coordinate system, the contact probe coordinate system and the chromatic confocal probe coordinate system to be parallel to and consistent with each other, respectively;

establishing homogeneous transformation matrices from the machine coordinate system to an X-axis coordinate system, from the X-axis coordinate system to a Y-axis coordinate system, and from the Y-axis coordinate system to a Z-axis coordinate system, respectively;

setting a direction vector of the contact probe with respect to an origin of the machine coordinate system as $\overrightarrow{O_C O_T}=(\delta x, \delta y, \delta z)$ to obtain a homogeneous transformation matrix from the Z-axis coordinate system to the chromatic confocal probe coordinate system;

setting reading of the chromatic confocal probe as d to obtain a homogeneous transformation matrix from the chromatic confocal probe coordinate system to the workpiece coordinate system;

obtaining a homogeneous transformation matrix from the machine coordinate system to the workpiece coordinate system according to the homogeneous transformation matrix from the machine coordinate system to the X-axis coordinate system, the homogeneous transformation matrix from the X-axis coordinate system to the Y-axis coordinate system, the homogeneous transformation matrix from the Y-axis coordinate system to the Z-axis coordinate system, the homogeneous transformation matrix from the Z-axis coordinate system to the chromatic confocal probe coordinate system, and the homogeneous transformation matrix from the chromatic confocal probe coordinate system to the workpiece coordinate system;

obtaining a theoretical coordinate of the point on the workpiece in the machine coordinate system according to a homogeneous transformation principle;

setting included angles between an optical axis of the chromatic confocal probe and three coordinate axes to obtain coordinates of the point on the workpiece measured by the chromatic confocal probe in the machine coordinate system.

As an embodiment of the present disclosure, establishing the system of linear equations in step S3 includes:

step S301, setting a calibration plane on the coordinate measuring machine, where the calibration plane is not parallel to each of X-axis, Y-axis, and Z-axis in the machine coordinate system, and establishing a plane equation, where the plane equation is established with four points in the calibration plane;

step S302, obtaining information of a point on the calibration plane by using the chromatic confocal probe, moving the chromatic confocal probe to obtain information of another point in the calibration plane, substituting information of two points into the plane equation and subtracting the information of two points to obtain an equation with the zero reference position eliminated;

step S303, selecting other two calibration planes, and repeating step S302 to obtain other two equations in each of which information of two points is subtracted;

step S304, combining the equations in steps S302 and S303 to establish a system of linear equations, and solving the system of equations to obtain the spatial pose of the chromatic confocal probe.

As an embodiment of the present disclosure, the theoretical coordinate of the point on the workpiece in the machine coordinate system is calculated as follows:

expressing the homogeneous transformation matrix from the machine coordinate system to the X-axis coordinate system, the homogeneous transformation matrix from the X-axis coordinate system to the Y-axis coordinate system, and the homogeneous transformation matrix from the Y-axis coordinate system to the Z-axis coordinate system are respectively as follows:

$$
{}_{X}^{B}T^i = \begin{bmatrix} 1 & 0 & 0 & x_m \\ 0 & 1 & 0 & 0 \\ 0 & 0 & 1 & 0 \\ 0 & 0 & 0 & 1 \end{bmatrix}, {}_{Y}^{X}T^i = \begin{bmatrix} 1 & 0 & 0 & 0 \\ 0 & 1 & 0 & y_m \\ 0 & 0 & 1 & 0 \\ 0 & 0 & 0 & 1 \end{bmatrix}, {}_{Z}^{Y}T^i = \begin{bmatrix} 1 & 0 & 0 & 0 \\ 0 & 1 & 0 & 0 \\ 0 & 0 & 1 & z_m \\ 0 & 0 & 0 & 1 \end{bmatrix}, \quad (1)
$$

where $X_m$, $Y_m$ and $Z_m$ are coordinate readings of the contact probe, respectively;

setting a direction vector of the contact probe with respect to the origin of the machine coordinate system as $\overrightarrow{O_C O_T}=(\delta x, \delta y, \delta z)$ to obtain the transformation matrix from the Z-axis coordinate system to the chromatic confocal probe coordinate system as follows:

$$
{}_{S}^{Z}T^i = \begin{bmatrix} 1 & 0 & 0 & \delta x \\ 0 & 1 & 0 & \delta y \\ 0 & 0 & 1 & \delta z \\ 0 & 0 & 0 & 1 \end{bmatrix}; \quad (2)
$$

setting the reading of the chromatic confocal probe as d to obtain the homogeneous transformation matrix from the chromatic confocal probe coordinate system to the workpiece coordinate system as follows:

$$
{}_{B}^{S}T^i = \begin{bmatrix} 1 & 0 & 0 & 0 \\ 0 & 1 & 0 & d \\ 0 & 0 & 1 & 0 \\ 0 & 0 & 0 & 1 \end{bmatrix}; \quad (3)
$$

obtaining the homogeneous transformation matrix from the machine coordinate system to the workpiece coordinate system as follows:

$$
{}_{W}^{B}T^i = {}_{X}^{B}T^i \cdot {}_{Y}^{X}T^i \cdot {}_{Z}^{Y}T^i \cdot {}_{S}^{Z}T^i \cdot {}_{W}^{S}T^i = \begin{bmatrix} 1 & 0 & 0 & x_m + \delta x \\ 0 & 1 & 0 & y_m + \delta y + d \\ 0 & 0 & 1 & z_m + \delta z \\ 0 & 0 & 0 & 1 \end{bmatrix}; \quad (4)
$$

obtaining the coordinates of the point on the workpiece in the machine coordinate system by using the homogeneous coordinate transformation principle as follows:

$$
P_B = (X_m + \delta x, y_m + \delta y + d, z_m + \delta z) \quad (5).
$$

As an embodiment of the present disclosure, the coordinates of the point on the workpiece measured by the chromatic confocal probe in the machine coordinate system are calculated as follows:

setting the included angles between the optical axis of the chromatic confocal probe and the three coordinate axes as α, β, γ, and expressing a unit direction vector of the optical axis in the chromatic confocal probe coordinate system as $\vec{I}=(\cos\alpha, \cos\beta, \cos\gamma)=(a, b, c)$;

substituting the unit direction vector into the homogeneous transformation matrix from the machine coordinate system to the workpiece coordinate system:

$$\underset{W}{\overset{B}{}}T^i = \underset{X}{\overset{B}{}}T^i \cdot \underset{Y}{\overset{X}{}}T^i \cdot \underset{Z}{\overset{Y}{}}T^i \cdot \underset{S}{\overset{Z}{}}T^i \cdot \underset{W}{\overset{S}{}}T^i = \begin{bmatrix} 1 & 0 & 0 & x_m + \delta x + d \cdot a \\ 0 & 1 & 0 & y_m + \delta y + d \cdot b \\ 0 & 0 & 1 & z_m + \delta z + d \cdot c \\ 0 & 0 & 0 & 1 \end{bmatrix}; \quad (6)$$

obtaining the coordinates of the point on the workpiece measured by the chromatic confocal probe in the machine coordinate system by using the homogeneous coordinate transformation principle:

$$P_B = (X_m + \delta x + d \cdot a, y_m + \delta y + d \cdot b, z_m + \delta z + d \cdot c); \quad (7).$$

As an embodiment of the present disclosure, establishing the system of linear equations in step S3 includes:

expressing the plane equation as follows:

$$Ax + By + Cz + D = 0, \quad (8)$$

where A, B, C and D are parameters of spatial positions in the plane, respectively;

denoting a displacement value measured by the chromatic confocal probe as $d_1$, displacement values measured by the contact probe as $x_1$, $y_1$ and $z_1$, and obtaining point coordinates of $(x_1 + \delta x + d_1 \cdot a, y_1 + \delta y + d_1 \cdot b, z_1 + \delta z + d_1 \cdot c)$ according to Formula 7;

substituting the point coordinates into the plane equation to obtain formula 9:

$$A_1 \cdot (x_1 + \delta x + d_1 \cdot a) + B_1 \cdot (y_1 + \delta y + d_1 \cdot b) + C_1 \cdot (z_1 + \delta z + d_1 \cdot c) + D_1 = 0; \quad (9)$$

moving the chromatic confocal probe to measure another point on the plane, denoting a displacement value of another point measured by the chromatic confocal probe as $d_2$, displacement values measured by the contact probe as $x_2$, $y_2$ and $z_2$ to obtain another point coordinates $(x_2 + \delta x + d_2 \cdot a, y_2 + \delta y + d_2 \cdot b, z_2 + \delta z + d_2 \cdot c)$, and substituting the another point coordinates into the plane equation to obtain formula 10:

$$A_1 \cdot (x_2 + \delta x + d_2 \cdot a) + B_1 \cdot (y_2 + \delta y + d_2 \cdot b) + C_1 \cdot (z_2 + \delta z + d_2 \cdot c) + D_1 = 0; \quad (10)$$

subtracting Formula 10 from formula 9 to obtain:

$$(11)$$

$$[A_1 \cdot (d_1 - d_2) B_1 \cdot (d_1 - d_2)$$

$$C_1 \cdot (d_1 - d_2)] \cdot \begin{bmatrix} a \\ b \\ c \end{bmatrix} = [A_1 \cdot (x_1 - x_2) + B_1 \cdot (x_1 - x_2) + C_1 \cdot (x_1 - x_2)].$$

As an embodiment of the present disclosure, in step S303, the equations from the information of two points in the other two calibration planes are as follows:

$$[A_2 \cdot (d_3 - d_4) B_2 \cdot (d_3 - d_4) C_2 \cdot (d_3 - d_4)] \cdot \begin{bmatrix} a \\ b \\ c \end{bmatrix} = [A_2 \cdot (x_3 - x_4) + \quad (12)$$

$$B_2 \cdot (x_3 - x_4) + C_2 \cdot (x_3 - x_4)];$$

$$[A_3 \cdot (d_5 - d_6) B_3 \cdot (d_5 - d_6) C_3 \cdot (d_5 - d_6)] \cdot \begin{bmatrix} a \\ b \\ c \end{bmatrix} = [A_3 \cdot (x_5 - x_6) + \quad (13)$$

$$B_3 \cdot (x_5 - x_6) + C_3 \cdot (x_5 - x_6)];$$

formulas 11, 12, and 13 are combined to obtain the system of linear equations:

$$\begin{bmatrix} A_1 \cdot (d_1 - d_2) & B_1 \cdot (d_1 - d_2) & C_1 \cdot (d_1 - d_2) \\ A_2 \cdot (d_3 - d_4) & B_2 \cdot (d_3 - d_4) & C_2 \cdot (d_3 - d_4) \\ A_3 \cdot (d_5 - d_6) & B_3 \cdot (d_5 - d_6) & C_3 \cdot (d_5 - d_6) \end{bmatrix} \cdot \begin{bmatrix} a \\ b \\ c \end{bmatrix} = \quad (14)$$

$$\begin{bmatrix} A_1 \cdot (x_1 - x_2) + B_1 \cdot (x_1 - x_2) + C_1 \cdot (x_1 - x_2) \\ A_2 \cdot (x_3 - x_4) + B_2 \cdot (x_3 - x_4) + C_2 \cdot (x_3 - x_4) \\ A_3 \cdot (x_5 - x_6) + B_3 \cdot (x_5 - x_6) + C_3 \cdot (x_5 - x_6) \end{bmatrix}.$$

As an embodiment of the present disclosure, establishing the overdetermined system of equations in step S4 includes:

setting coordinates of a spherical center, a point O, of the spherical surface in the machine coordinate system as $(X_0, Y_0, Z_0)$, setting the included angles between the optical axis of the chromatic confocal probe and the three coordinate axes of the machine coordinate system as $\alpha$, $\beta$, $\gamma$, and setting a unit direction vector of the optical axis as $\vec{I}=(\cos\alpha, \cos\beta, \cos\gamma)=(a, b, c)$; setting a displacement value measured by the chromatic confocal probe as $d_7$, readings of the contact probe as $x_7$, $y_7$ and $z_7$, and coordinates of a point S on the spherical surface in the machine coordinate system as SC:

$$(x_7 + \delta x + d_7 \cdot a, y_7 + \delta y + d_7 \cdot b, z_7 + \delta z + d_7 \cdot c);$$

substituting the coordinates of the point S and coordinates of the point O into the sphere equation, where the point S is located on the spherical surface, and thus it is derived that $$\vec{SO} = R: \ f_1 = (x_7 + \delta x + d_7 \cdot a - X_0)^2 + \quad (15)$$

$$(y_7 + \delta y + d_7 \cdot b - Y_0)^2 + (z_7 + \delta z + d_7 \cdot c - Z_0)^2 - R^2 = 0$$

measuring another point T on the spherical surface by using the chromatic confocal probe, to obtain coordinates of the point T in the machine coordinate system as $T^C$:

$$(x_8 + \delta x + d_8 \cdot a, y_8 + \delta y + d_8 \cdot b, z_8 + \delta z + d_8 \cdot c);$$

substituting the coordinates of the point T and the coordinates of the point O into the sphere equation, where the point T is located on the spherical surface and thus it is derived that $$\vec{TO} = R: \ f_2 = (x_8 + \delta x + d_8 \cdot a - X_0)^2 + \quad (16)$$

$$(y_8 + \delta y + d_8 \cdot b - Y_0)^2 + (z_8 + \delta z + d_8 \cdot c - Z_0)^2 - R^2 = 0;$$

measuring point information of multiple points on the spherical surface by using the chromatic confocal probe, assuming the reading of the chromatic confocal probe as $d_i$, and the displacement information of the contact probe as $x_i$, $y_i$ and $z_i$ and obtaining the overdetermined system of equations as follows:

$$
\begin{cases}
(x_7 + \delta x + d_2 \cdot a - X_0)^2 + (y_7 + \delta y + d_2 \cdot b - Y_0)^2 + \\
\quad (z_7 + \delta z + d_2 \cdot c - Z_0)^2 - r^2 = 0 \\
(x_8 + \delta x + d_8 \cdot a - X_0)^2 + (y_8 + \delta y + d_8 \cdot b - Y_0)^2 + \\
\quad (z_8 + \delta z + d_8 \cdot c - Z_0)^2 - r^2 = 0 \\
\quad\quad\quad \vdots \\
\quad\quad\quad \vdots \\
(x_i + \delta x + d_i \cdot a - X_0)^2 + (y_i + \delta y + d_i \cdot b - Y_0)^2 + \\
\quad (z_i + \delta z + d_i \cdot c - Z_0)^2 - r^2 = 0
\end{cases} \tag{17}
$$

where a constraint condition of formula 17 is as follows:

$$
\begin{cases}
a^2 + b^2 + c^2 = 1 \\
-1 \leq a, b, c \leq 1
\end{cases} \tag{18}
$$

As an embodiment of the present disclosure, formula 17 is solved by a Levenberg-Marquardt (LM) iterative algorithm to obtain the zero reference position of the chromatic confocal probe.

The above technical features can be combined with each other without conflicting with each other.

In generally, compared with the prior art, the above technical scheme conceived by the present disclosure has the following beneficial effects.

(1) The method for calibrating the spatial pose and position of the chromatic confocal probe with combined planar and spherical constraints of the present disclosure uses a contact probe for assisting measurement. A standard structure formed by the coordinate measuring machine and the contact probe enables the positions of the contact probe and the coordinate measuring machine to be relative standard. After the measurement coordinates of the contact probe and the chromatic confocal probe are transformed into a machine coordinate system, the measurement results of the contact probe at the standard position can provide data for the chromatic confocal probe. Second, in the calculation process of the present disclosure, the spatial pose and the zero reference position of the chromatic confocal probe are decoupled to calculate the spatial pose and the zero position separately, which can greatly improve the calibration accuracy and efficiency.

(2) The method for calibrating the spatial pose and position of the chromatic confocal probe with combined planar and spherical constraints of the present disclosure releases coupling between a beam direction and a zero reference position by introducing a spatial equation elimination method, and obtains the system of linear equations only containing the beam direction and position parameters, so as to obtain the spatial pose of the chromatic confocal probe. The solution process can eliminate the influence of the zero reference position on the spatial pose, and the method of solving the system of linear equations can greatly improve the precision of the spatial pose. After being solved, the spatial pose is substituted into a system of nonlinear equations containing the zero reference position for solution. At this time, an iterative algorithm is used to solve the three unknowns of the zero reference position, which can avoid the tedious and error problems of solving the six unknowns of the zero reference position and the spatial pose together in the traditional method and greatly improve the calculation precision of the zero reference position.

(3) The method for calibrating the spatial pose and position of the chromatic confocal probe with combined planar and spherical constraints solves the spatial pose and the zero reference position of the chromatic confocal probe by plane equations and sphere equations. The moving position and the moving mode of the chromatic confocal probe are not limited in the calibration process of the chromatic confocal probe, which can avoid the complicated calibration process under multiple restrictions such as a fixed point, a fixed distance and a fixed angle in the conventional calibration method, simplify the pose calibration process of the chromatic confocal probe, and improve the calibration efficiency.

BRIEF DESCRIPTION OF THE DRAWINGS

FIG. 6 is a schematic flow chart of a method for calibrating a spatial pose and position of a chromatic confocal probe with combined planar and spherical constraints according to an embodiment of the present disclosure.

DETAILED DESCRIPTION OF THE EMBODIMENTS

Figure 1:
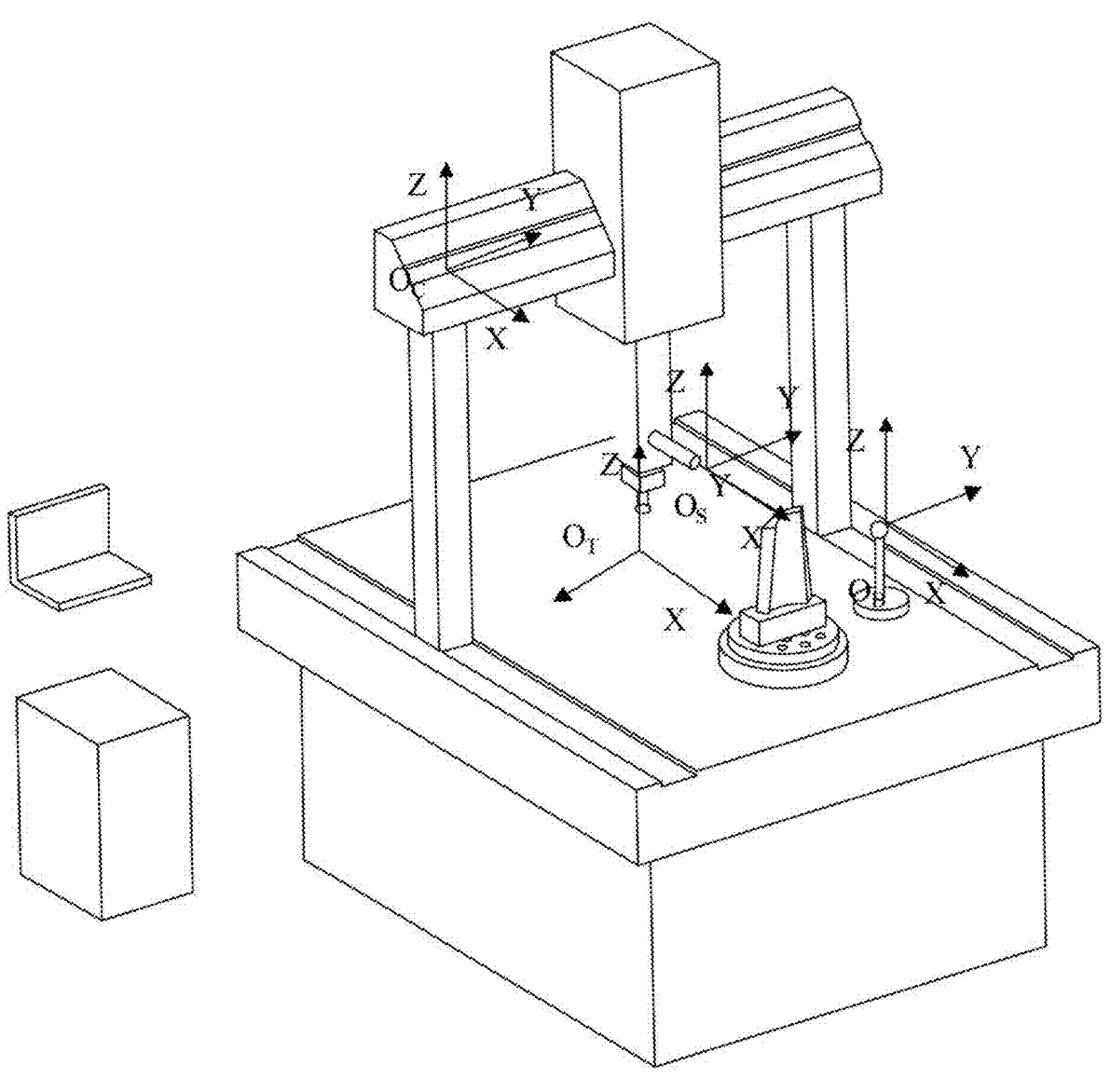
FIG. 1 is a schematic diagram of a structure of a coordinate measuring machine according to an embodiment of the present disclosure.

In order to clarify the objective, the technical scheme and advantages of the present disclosure, the present disclosure will be further described in detail with reference to the drawings and embodiments. It should be understood that the specific embodiments described here are only used to explain the present disclosure, and are not intended to limit the present disclosure. In addition, the technical features involved in various embodiments of the present disclosure described below can be combined with each other without conflicting with each other.

In the description of the present disclosure, it should be understood that unless otherwise specified, the orientation or positional relationship indicated by the terms such as "center", "longitudinal", "lateral", "length", "width", "thickness", "upper", "lower", "front", "rear", "left", "right", "vertical", "horizontal", "top", "bottom", "inside", "outside", "clockwise", "counterclockwise", "axial", "radial", "circumferential", etc., is based on the orientation or positional relationship shown in the drawings, which is only for the convenience of describing the present disclosure and simplifying the description, and is not intended to indicate or imply that the apparatus or element referred to must have a specific orientation, be constructed and operated in a specific orientation, and thus should not be construed as a limitation of the present disclosure.

In addition, unless otherwise specified, the terms "first" and "second" are only used for descriptive purposes, and cannot be understood as indicating or implying relative importance or implicitly indicating the number of indicated technical features. Therefore, the features defined with "first" and "second" can explicitly or implicitly include at least one of the features. In the description of the present disclosure, "a plurality of" means at least two, such as two, three, etc., unless otherwise specifically defined.

In the present disclosure, unless otherwise specified and defined, the terms "mounting", "connecting", "linking" and "fixing" should be broadly understood, for example, fixed connection, detachable connection, or integrally connection; or mechanical connection or electrical connection; or direct connection or indirect connection through an intermediary, or internal connection of two elements or interaction between two elements, unless otherwise specifically defined. For those skilled in the art, the specific meanings of the above terms in the present disclosure can be understood according to specific situations.

In the present disclosure, unless otherwise specified and defined, the first feature "above" or "below" the second feature may indicate the direct contact between the first feature and the second feature, or the indirect contact between the first feature and the second feature through an intermediary. Moreover, the first feature "above", "over" and "on" the second feature may indicate that the first feature is directly above or obliquely above the second feature, or just indicate that the horizontal height of the first feature is higher than that of the second feature. The first feature "under", "below" and "beneath" the second feature may indicate that the first feature is directly or obliquely below the second feature, or just indicate that the horizontal height of the first feature is lower than that of the second feature.

EMBODIMENTS

With reference to FIG. 1 to FIG. 6, the method for calibrating the spatial pose and position of the chromatic confocal probe with combined planar and spherical constraints in the preferred embodiment of the present disclosure is completed by a coordinate measuring machine. The coordinate measuring machine is provided with a chromatic confocal probe and a contact probe, where the coordinate measuring machine includes a measuring platform. Two sliding rails arranged side by side are arranged on the measuring platform along a first direction. First support columns are vertically arranged on the two sliding rails. A connecting column is arranged between the two first support columns. The connecting column is arranged along a second direction. A telescopic column is slidably arranged on the connecting column. A lower end of the telescopic column is provided with a chromatic confocal probe and a contact probe. The lower end of the telescopic column is telescopic, so that the chromatic confocal probe and the contact probe can move synchronously along a third direction. The chromatic confocal probe and the contact probe can move along the first direction, the second direction, and the third direction using the coordinate measuring machine, so as to complete the measurement of the chromatic confocal probe and the contact probe.

Further, the contact probe in the present disclosure is a standard structure provided on the coordinate measuring machine. That is, the error between the contact probe and the coordinate measuring machine is controlled within a precise range, which is predictable or foreseeable. When sensing result of the contact probe is introduced into the pose calibration of a spectral workpiece probe, data measured by the contact probe can be used as standard data, which introduces relatively small error, and thus is beneficial to improving the precision of the pose calibration of the chromatic confocal probe.

Further, the chromatic confocal probe in the present disclosure is fixed at the end of the telescopic column with a clamping structure. There will be some errors in the relative fixation between the clamping structure and the chromatic confocal probe, which will lead to the deviation of the spatial pose of the chromatic confocal probe. That is, the optical axis of the chromatic confocal probe is deviated from the first direction, the second direction and the third direction on the coordinate measuring machine. Preferably, the first direction in the present disclosure is the X-axis direction, the second direction is the Y-axis direction, and the third direction is the Z-axis direction.

Further, the calibration of the pose and position of the chromatic confocal probe in the present disclosure is performed by the coordinate measuring machine, which includes the following steps:

step S1, establishing a machine coordinate system, a contact probe coordinate system, a chromatic confocal probe coordinate system and a workpiece coordinate system;

step S2, acquiring position information of a point on a workpiece by using a contact probe, and transforming point information obtained in the contact probe coordinate system into coordinate information in the machine coordinate system; and in consideration of a mounting inclination angle of the chromatic confocal probe, obtaining coordinate information of the point on the workpiece under the chromatic confocal probe, and transforming point information obtained in the chromatic confocal probe coordinate system into the coordinate information in the machine coordinate system;

step S3, acquiring coordinate information of at least two points in a plane by using the chromatic confocal probe, moving the chromatic confocal probe to measure the coordinate information of the at least two points separately, and establishing a linear equation; acquiring coordinate information of at least two points in each of at least three planes, and establishing a system of linear equations, where the system of linear equations includes a spatial pose of the chromatic confocal probe; and solving the system of linear equations to obtain the spatial pose of the chromatic confocal probe;

step S4, measuring coordinate information of at least three points on a spherical surface by using the chromatic confocal probe, moving the chromatic confocal probe to measure the coordinate information of the at least three points, respectively, substituting information of the at least three points into a sphere equation, establishing an overdetermined system of equations, where the overdetermined system of equations includes the spatial pose and zero reference position of the chromatic confocal probe, and substituting the spatial pose of the chromatic confocal probe in step S3 into the overdetermined system of equations for solution to obtain the zero reference position of the chromatic confocal probe.

In the pose calibration process of a conventional chromatic confocal probe, the spatial pose and the zero reference position of the chromatic confocal probe are usually solved in the same system of equations, and because the system of equations is a system of nonlinear equations, the deviation resulted from many unknowns will gradually accumulate in the process of iterative calculation, resulting in large errors of the calculated spatial pose and the fixed-point position. Second, due to the error in the mounting position of the chromatic confocal probe itself, in order to ensure the values of known parameters in the system of equations, it is usually necessary to drive the chromatic confocal probe to move in a manner of a fixed point, a fixed distance, a fixed angle, etc., that is, to measure at a set point, so that the calibration process of the chromatic confocal probe is complicated, cumbersome, and time and labor consuming.

The method for calibrating the spatial pose and position of the chromatic confocal probe with combined planar and spherical constraints of the present disclosure uses a contact probe for assisting measurement. A standard structure formed by the coordinate measuring machine and the contact probe enables the positions of the contact probe and the coordinate measuring machine to be relatively standard. After the measurement coordinates of the contact probe and the chromatic confocal probe are transformed into the machine coordinate system, the contact probe at the standard position can drive the chromatic confocal probe to obtain the displacement information, and can help determine the pose of the chromatic confocal probe. Second, in the calculation process of the present disclosure, the spatial pose and the zero position of the chromatic confocal probe are decoupled to calculate the spatial pose and the zero position of the chromatic confocal probe separately. The fewer unknowns in the same system of equations indicates the more accurate calculation result and the higher calculation efficiency, which can greatly improve the calibration precision and efficiency of the spatial pose and position of the chromatic confocal probe.

Specifically, in the present disclosure, the method for calibrating the spatial pose and position of the chromatic confocal probe with combined planar and spherical constraints refers to the method for calibrating the spatial pose and the zero reference position of the chromatic confocal probe. The machine coordinate system in the present disclosure corresponds to the machine coordinate system $O_C$-XYZ. The machine coordinate system takes the absolute zero position of a grating ruler of each axis in the three-axis coordinate system as the origin, the three-axis directions are parallel to the XYZ axes in the three-axis coordinate measuring machine respectively, and three axis sizes are consistent with that of the XYZ axes in the coordinate measuring machine, respectively. The contact probe coordinate system in the present disclosure is $O_T$-XYZ, in which the center of a detecting tip sphere of the contact probe is taken as the origin of the coordinate system, the three coordinate axes of the $O_T$-XYZ system are parallel to the three coordinate axes of the $O_C$-XYZ system, respectively, and the probe reading of the contact probe is the coordinate of the point Or in the $O_C$-XYZ system. The chromatic confocal probe coordinate system in the present disclosure is $O_S$-XYZ, in which the starting point of the measuring range of the chromatic confocal probe is taken as the coordinate origin, and the three coordinate axes of the $O_S$-XYZ system are parallel to the three coordinate axes of the $O_C$-XYZ system, respectively. The workpiece coordinate system in the present disclosure is $O_B$-XYZ. The workpiece coordinate system defines the origin with workpiece features, the directions of XYZ axes are parallel to the axes of $O_C$-XYZ system, respectively, and the sizes of XYZ axes are consistent with that of the axes of $O_C$-XYZ system.

As an optional embodiment of the present disclosure, in the above Step S2, the contact probe and the chromatic confocal probe move synchronously, and the coordinate information when the contact probe performs measurement is an exact value; and the point information on the workpiece calculated by the contact probe is substituted into the point on the workpiece calculated by the chromatic confocal probe to obtain coordinate information of the point on the workpiece measured by the chromatic confocal probe in the machine coordinate system. In the conventional calibration method, the chromatic confocal probe needs to be tested at a specific point to ensure the accuracy of the position of the chromatic confocal probe. In the present disclosure, the synchronous displacement mode of the chromatic confocal probe and the contact probe enables the test data of the contact probe to calibrate the displacement information of the chromatic confocal probe in the test process. That is to say, the displacement information of the chromatic confocal probe moving from one point to another in the test process can be acquired by the contact probe.

Further, as an optional embodiment of the present disclosure, the coordinate information of the point on the workpiece measured by the chromatic confocal probe in the machine coordinate system in step S2 is acquired as follows:

causing directions of three axes of X, Y and Z in the machine coordinate system, the contact probe coordinate system and the chromatic confocal probe coordinate system to be parallel to and consistent with each other, respectively;

establishing homogeneous transformation matrices from the machine coordinate system to an X-axis coordinate system, from the X-axis coordinate system to a Y-axis coordinate system, and from the Y-axis coordinate system to a Z-axis coordinate system, respectively;

setting a direction vector of the contact probe with respect to the origin of the machine coordinate system as $\overrightarrow{O_C O_T}=(\delta x, \delta y, \delta z)$ to obtain a homogeneous transformation matrix from the Z-axis coordinate system to the probe coordinate system;

setting the reading of the chromatic confocal probe as d to obtain a homogeneous transformation matrix from the chromatic confocal probe coordinate system to the workpiece coordinate system;

obtaining a homogeneous transformation matrix from the machine coordinate system to the workpiece coordinate system according to the homogeneous transformation matrix from the machine coordinate system to the X-axis coordinate system, the homogeneous transformation matrix from the X-axis coordinate system to the Y-axis coordinate system, the homogeneous transformation matrix from the Y-axis coordinate system to the Z-axis coordinate system, the homogeneous transformation matrix from the Z-axis coordinate system to the chromatic confocal probe coordinate system, and the homogeneous transformation matrix from the chromatic confocal probe coordinate system to the workpiece coordinate system;

obtaining a theoretical coordinate of the point on the workpiece in the machine coordinate system according to a homogeneous transformation principle;

setting included angles between an optical axis of the chromatic confocal probe and three coordinate axes to obtain coordinates of the point on the workpiece measured by the chromatic confocal probe in the machine coordinate system.

Figure 2:
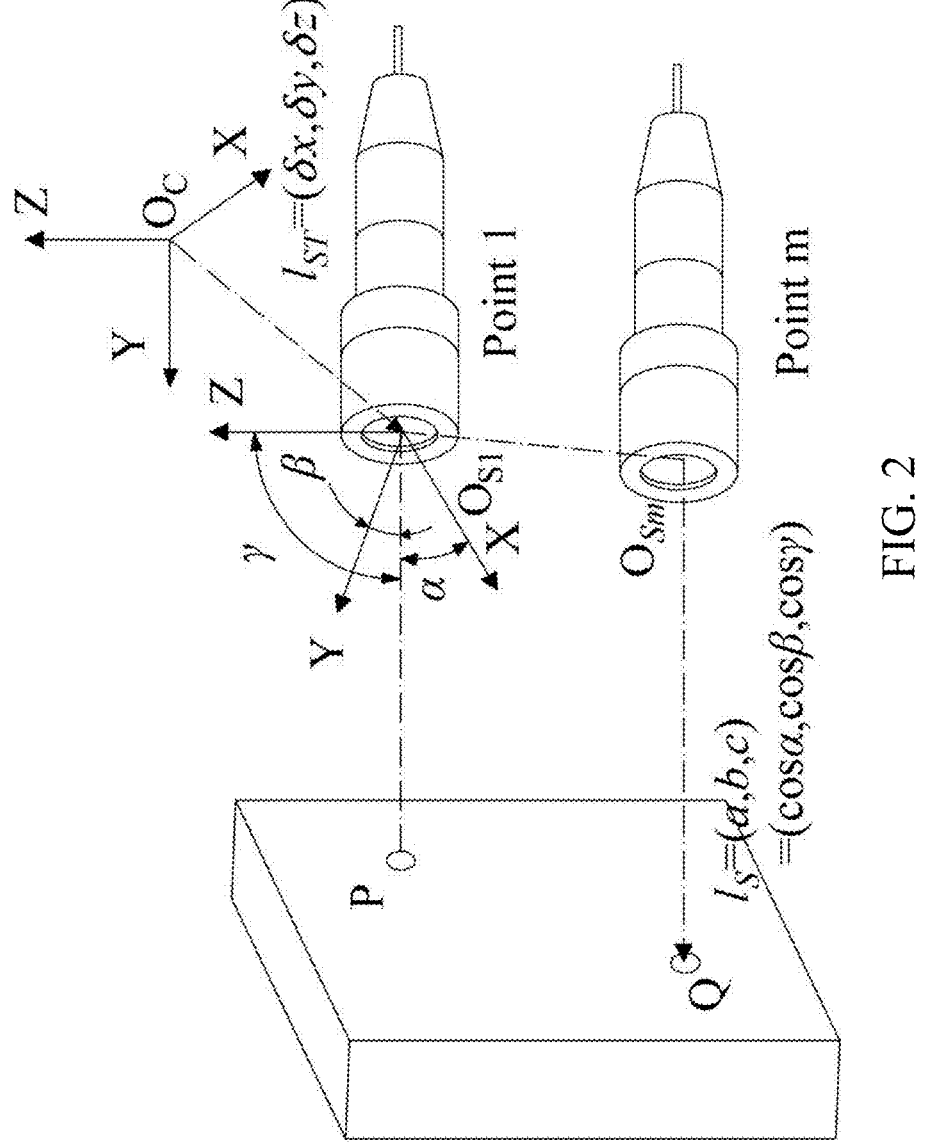
FIG. 2 is a schematic diagram of calibration of a plane by a chromatic confocal probe according to an embodiment of the present disclosure.

Further, as an optional embodiment of the present disclosure, establishing the system of linear equations in step S3 of the present application includes the following steps:

step S301, setting a calibration plane on the coordinate measuring machine, where the calibration plane is not parallel to each of X-axis, Y-axis, and Z-axis in the machine coordinate system, and establishing a plane equation, where the plane equation is established with four points in the calibration plane;

step S302, as shown in FIG. 2, obtaining information of a point P on the calibration plane by using the chromatic confocal probe, moving the chromatic confocal probe to obtain information of another point Q in the calibration plane, substituting information of two points into the plane equation and subtracting the information of two points to obtain an equation with the zero reference position eliminated;

step S303, selecting other two calibration planes, and repeating step S302 to obtain other two equations, in each of which information of two points is subtracted;

step S304, combining the equations in steps S302 and S303 to establish a system of linear equations, and solving the system of equations to obtain the spatial pose of the chromatic confocal probe.

Further, as an optional embodiment of the present disclosure, in the present disclosure, the theoretical coordinate of the point on the workpiece in the machine coordinate system is calculated as follows.

First, the homogeneous transformation matrix from the machine coordinate system to the X-axis coordinate system, the homogeneous transformation matrix from the X-axis coordinate system to the Y-axis coordinate system, and the homogeneous transformation matrix from the Y-axis coordinate system to the Z-axis coordinate system are respectively, as follows:

$$
{}_{X}^{B}T^{i} = \begin{bmatrix} 1 & 0 & 0 & x_m \\ 0 & 1 & 0 & 0 \\ 0 & 0 & 1 & 0 \\ 0 & 0 & 0 & 1 \end{bmatrix},\ {}_{Y}^{X}T^{i} = \begin{bmatrix} 1 & 0 & 0 & 0 \\ 0 & 1 & 0 & y_m \\ 0 & 0 & 1 & 0 \\ 0 & 0 & 0 & 1 \end{bmatrix}, \tag{1}
$$

$$
{}_{Z}^{Y}T^{i} = \begin{bmatrix} 1 & 0 & 0 & 0 \\ 0 & 1 & 0 & 0 \\ 0 & 0 & 1 & z_m \\ 0 & 0 & 0 & 1 \end{bmatrix};
$$

where $X_m$, $Y_m$ and $Z_m$ are coordinate readings of the contact probe, respectively. The contact probe moves along three directions of X, Y and Z through the coordinate measuring machine to contact the contact end of the contact probe with the point on the workpiece, so as to obtain the position information of the point on the workpiece. In this way, the coordinate reading of the contact probe is the displacement distance along three directions of X, Y and Z.

A direction vector of the contact probe with respect to the origin of the machine coordinate system is set as $\overrightarrow{O_C O_I}=(\delta x, \delta y, \delta z)$ to obtain the transformation matrix from the Z-axis coordinate system to the chromatic confocal probe coordinate system as follows:

$$
{}_{S}^{Z}T^{i} = \begin{bmatrix} 1 & 0 & 0 & \delta x \\ 0 & 1 & 0 & \delta y \\ 0 & 0 & 1 & \delta z \\ 0 & 0 & 0 & 1 \end{bmatrix}. \tag{2}
$$

The reading of the chromatic confocal probe is set as d to obtain a homogeneous transformation matrix from the chromatic confocal probe coordinate system to the workpiece coordinate system as follows:

$$
{}_{B}^{S}T^{i} = \begin{bmatrix} 1 & 0 & 0 & 0 \\ 0 & 1 & 0 & d \\ 0 & 0 & 1 & 0 \\ 0 & 0 & 0 & 1 \end{bmatrix}. \tag{3}
$$

Combining formula 1, formula 2, and formula 3, the homogeneous transformation matrix from the machine coordinate system to the workpiece coordinate system is obtained as follows:

$$
{}_{W}^{B}T^{i} = {}_{X}^{B}T^{i} \cdot {}_{Y}^{X}T^{i} \cdot {}_{Z}^{Y}T^{i} \cdot {}_{S}^{Z}T^{i} \cdot {}_{W}^{S}T^{i} = \begin{bmatrix} 1 & 0 & 0 & x_m + \delta x \\ 0 & 1 & 0 & y_m + \delta y + d \\ 0 & 0 & 1 & z_m + \delta z \\ 0 & 0 & 0 & 1 \end{bmatrix}; \tag{4}
$$

where d is the distance between the origin of the chromatic confocal probe system and the point on the workpiece obtained by reception and calculation after the chromatic confocal probe emits the test light to the point on the workpiece.

The coordinates of the point on the workpiece in the machine coordinate system obtained by using the homogeneous coordinate transformation principle is as follows:

$$
P_B = (x_m + \delta x, y_m + \delta y + d, z_m + \delta z) \tag{5}.
$$

Further, as an optional embodiment of the present disclosure, in the present disclosure, the coordinates of the point on the workpiece measured by the chromatic confocal probe in the machine coordinate system is calculated as follows:

setting the included angles between the optical axis of the chromatic confocal probe and the three coordinate axes as $\alpha$, $\beta$, $\gamma$, and assuming a unit direction vector of the optical axis in the chromatic confocal probe coordinate system as $\overline{I}=(\cos \alpha, \cos \beta, \cos \gamma)=(a, b, c)$;

substituting the unit direction vector into the homogeneous transformation matrix from the machine coordinate system to the workpiece coordinate system:

$$
{}_{W}^{B}T^{i} = {}_{X}^{B}T^{i} \cdot {}_{Y}^{X}T^{i} \cdot {}_{Z}^{Y}T^{i} \cdot {}_{S}^{Z}T^{i} \cdot {}_{W}^{S}T^{i} = \begin{bmatrix} 1 & 0 & 0 & x_m + \delta x + d \cdot a \\ 0 & 1 & 0 & y_m + \delta y + d \cdot b \\ 0 & 0 & 1 & z_m + \delta z + d \cdot c \\ 0 & 0 & 0 & 1 \end{bmatrix}; \tag{6}
$$

obtaining the coordinates of the point on the workpiece measured by the chromatic confocal probe in the machine coordinate system by using the homogeneous coordinate transformation principle:

$$
P_B = (x_m + \delta x + d \cdot a, y_m + \delta y + d \cdot b, z_m + \delta z + d \cdot c). \tag{7}
$$

Further, as an optional embodiment of the present disclosure, in the present disclosure, establishing the system of linear equations in step S3 is as follows.

The plane equation is as follows:

$Ax+By+Cz+D=0$, (8) where A, B, C and D are parameters of spatial positions of four points in a plane.

In the above formula 8, the contact probe is used to measure each parameter, and the Singular Value Decomposition (SVD) method is used to solve a plane point cloud, so that the sum of the distances from the plane to all points is the shortest, and then each point and the position of the plane in which the point is located are obtained by fitting, so as to reduce the calculation error.

Thereafter, a displacement value measured by the chromatic confocal probe is set as $d_1$, displacement values measured by the contact probe are $x_1$, $y_1$ and $z_1$, and according to formula 7, the point coordinate of point P is $(x_1+\delta x+d_1\cdot a,\ y_1+\delta y+d_1\cdot b,\ z_1+\delta z+d_1\cdot c)$.

The point coordinates are substituted into the plane equation to obtain formula 9:

$$A_1\cdot(x_1+\delta x+d_1\cdot a)+B_1\cdot(y_1+\delta y+d_1\cdot b)+C_1\cdot(z_1+\delta z+d_1\cdot c)+D_1=0. \tag{9}$$

The chromatic confocal probe moves to measure and calculate another point Q on the plane, a displacement value of another point measured by the chromatic confocal probe is $d_2$, displacement values measured by the contact probe are $x_2$, $y_2$ and $z_2$ to obtain another point coordinates $(x_2+\delta x+d_2\cdot a,\ y_2+\delta y+d_2\cdot b,\ z_2+\delta z+d_2\cdot c)$, and the other point coordinates are substituted into the plane equation to obtain formula 10:

$$A_1\cdot(x_2+\delta x+d_2\cdot a)+B_1\cdot(y_2+\delta y+d_2\cdot b)+C_1\cdot(z_2+\delta z+d_2\cdot c)+D_1=0 \tag{10}.$$

Formula 10 is subtracted from formula 9 to obtain:

$$[A_1\cdot(d_1-d_2)B_1\cdot(d_1-d_2)C_1\cdot(d_1-d_2)]\cdot\begin{bmatrix}a\\b\\c\end{bmatrix}=[A_1\cdot(x_1-x_2)+B_1\cdot(x_1-x_2)+C_1\cdot(x_1-x_2)]. \tag{11}$$

It can be seen from the above formula 11 that the zero reference position $\overrightarrow{O_C O_7}=(\delta x,\ \delta y,\ \delta z)$ in the formula is eliminated. At this time, the zero reference position and the spatial pose have been decoupled, that is, the calculation of the spatial pose of the chromatic confocal probe is not affected by the zero reference position. Only the spatial poses a, b and c are included in formula 10, so that the spatial pose of the chromatic confocal probe can be obtained.

Further, as an optional embodiment of the present disclosure, in the present disclosure, in step S303, the equations obtained from the information of two points in the other two calibration planes are as follows:

$$[A_2\cdot(d_3-d_4)B_2\cdot(d_3-d_4)C_2\cdot(d_3-d_4)]\cdot\begin{bmatrix}a\\b\\c\end{bmatrix}= \tag{12}$$

$$[A_2\cdot(x_3-x_4)+B_2\cdot(x_3-x_4)+C_2\cdot(x_3-x_4)]; \tag{13}$$

$$[A_3\cdot(d_5-d_6)B_3\cdot(d_5-d_6)C_3\cdot(d_5-d_6)]\cdot\begin{bmatrix}a\\b\\c\end{bmatrix}=[A_3\cdot(x_5-x_6)+B_3\cdot(x_5-x_6)+C_3\cdot(x_5-x_6)].$$

Formulas 11, 12, and 13 are combined to obtain the system of linear equations:

$$\begin{bmatrix}A_1\cdot(d_1-d_2) & B_1\cdot(d_1-d_2) & C_1\cdot(d_1-d_2)\\A_2\cdot(d_3-d_4) & B_2\cdot(d_3-d_4) & C_2\cdot(d_3-d_4)\\A_3\cdot(d_5-d_6) & B_3\cdot(d_5-d_6) & C_3\cdot(d_5-d_6)\end{bmatrix}\cdot\begin{bmatrix}a\\b\\c\end{bmatrix}= \tag{14}$$

$$\begin{bmatrix}A_1\cdot(x_1-x_2)+B_1\cdot(x_1-x_2)+C_1\cdot(x_1-x_2)\\A_2\cdot(x_3-x_4)+B_2\cdot(x_3-x_4)+C_2\cdot(x_3-x_4)\\A_3\cdot(x_5-x_6)+B_3\cdot(x_5-x_6)+C_3\cdot(x_5-x_6)\end{bmatrix}.$$

Specifically, there are three equations and three unknowns in the above formula 14, which can be solved to obtain three unknowns of the spatial pose. Optionally, the present disclosure can also increase the number of measurement groups, establish an overdetermined system of linear equations, and solve the least square solution of the system of equations A·X=B;

$$X=A^{-1}(A^T)^{-1}A^T B, \tag{19}$$

where, $A^{-1}(A^T)^{-1}A^T$ is a generalized inverse matrix of m×n (m>n) matrix A, which can be solved to obtain the spatial position a, B, Y.

Figure 3:
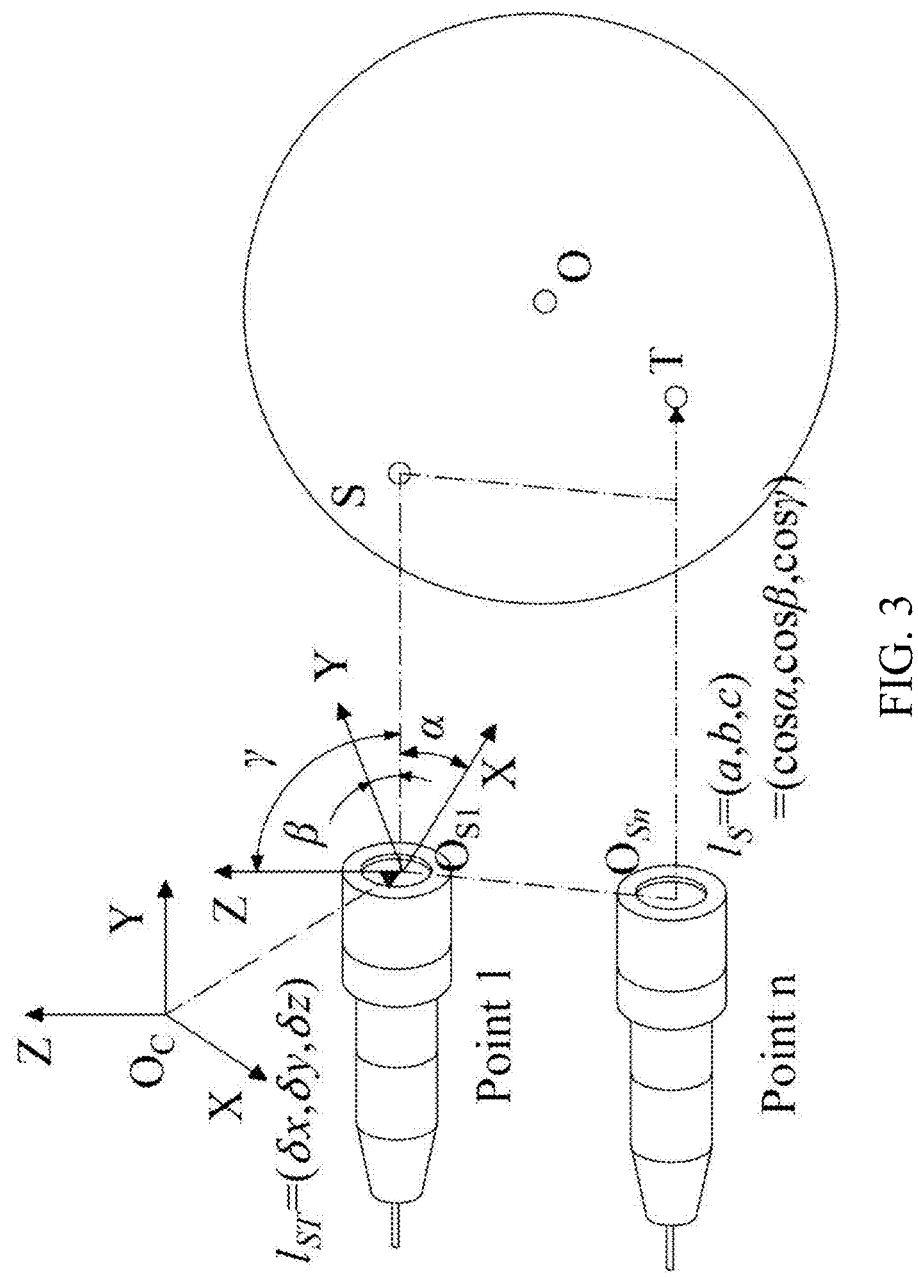
FIG. 3 is a schematic diagram of calibration of a spherical surface by a chromatic confocal probe according to an embodiment of the present disclosure.

Further, as an optional embodiment of the present disclosure, in the present disclosure, establishing an overdetermined system of equations in step S4 is as follows:

setting coordinates of a spherical center of the spherical surface in the machine coordinate system as $(X_0, Y_0, Z_0)$, setting the included angles between the optical axis of the chromatic confocal probe and the three coordinate axes of the machine coordinate system as $\alpha$, $\beta$, $\gamma$, and setting a unit direction vector of the optical axis as $\vec{I}=(\cos\alpha,\ \cos\beta,\ \cos\gamma)=(a, b, c)$; setting a displacement value measured by the chromatic confocal probe as $d_7$, readings of the contact probe as $x_7$, $y_7$ and $z_7$, and coordinates of a point S (as shown in FIG. 3) on the spherical surface in the machine coordinate system as $S^C$:

$$(x_7+\delta x+d_7\cdot a, y_7+\delta y+d_7\cdot b, z_7+\delta z+d_7\cdot c);$$

substituting coordinates of the point S and point O (as shown in FIG. 3) into the sphere equation, where the point S is located on the spherical surface and thus it is derived that $$\overrightarrow{SO}=R:\ f_1=(x_7+\delta x+d_7\cdot a-X_0)^2+ \tag{15}$$
$$(y_7+\delta y+d_7\cdot b-Y_0)^2+(z_7+\delta z+d_7\cdot c-Z_0)^2-R^2=0$$

measuring another point T (as shown in FIG. 3) on the spherical surface by the chromatic confocal probe, and obtaining coordinates of the point T in the machine coordinate system as $T^C$:

$$(x_8+\delta x+d_8\cdot a, y_8+\delta y+d_8\cdot b, z_8+\delta z+d_8\cdot c);$$

substituting the coordinates of the point T and point O into the sphere equation, where the point T is located on the spherical surface, and thus it is derived that $$\overrightarrow{TO}=R:\ f_2=(x_8+\delta x+d_8\cdot a-X_0)^2+ \tag{16}$$
$$(y_8+\delta y+d_8\cdot b-Y_0)^2+(z_8+\delta z+d_8\cdot c-Z_0)^2-R^2=0;$$

measuring point information of multiple points on the spherical surface by the chromatic confocal probe, assuming the reading of the chromatic confocal probe as $d_i$, and the displacement information of the contact probe as $x_i$, $y_i$ and $z_i$, and obtaining the overdetermined system of equations as follows:

$$\begin{cases} (x_7 + \delta x + d_2 \cdot a - X_0)^2 + (y_7 + \delta y + d_2 \cdot b - Y_0)^2 + (z_7 + \delta z + d_2 \cdot c - Z_0)^2 - r^2 = 0 \\ (x_8 + \delta x + d_8 \cdot a - X_0)^2 + (y_8 + \delta y + d_8 \cdot b - Y_0)^2 + (z_8 + \delta z + d_8 \cdot c - Z_0)^2 - r^2 = 0 \\ \qquad\qquad\qquad\qquad \vdots \\ (x_i + \delta x + d_i \cdot a - X_0)^2 + (y_i + \delta y + d_i \cdot b - Y_0)^2 + (z_i + \delta z + d_i \cdot c - Z_0)^2 - r^2 = 0 \end{cases} \quad (17)$$

where a constraint condition of formula 17 is as follows:

$$\begin{cases} a^2 + b^2 + c^2 = 1 \\ -1 \le a, b, c \le 1 \end{cases} \quad (18)$$

In the present disclosure, the contact probe and the chromatic confocal probe are controlled to perform measurement together, the contact probe is used to measure enough points on the standard sphere to obtain overdetermined sphere equations, and then the chromatic confocal probe is used to measure at least any three points on the standard sphere. Because the spatial pose $\bar{T}=(\cos \alpha, \cos \beta, \cos \gamma)=(a, b, c)$ of the chromatic confocal probe has been obtained by the above formula 14, after the spatial pose is substituted in to formula 17, it can be seen that the process of solving the zero reference position $\overrightarrow{O_C O_T}=(\delta x, \delta y, \delta z)$ is transformed into solving a decoupled system of nonlinear equations. For the system of nonlinear equations, a Levenberg-Marquardt (LM) iterative algorithm can be used for solution to obtain the zero reference position.

Further, aiming at the method for calibrating the spatial pose and position of the chromatic confocal probe with combined planar and spherical constraints in the present disclosure, simulation can be used to verify error values.

Specifically, in order to correspond to the above-mentioned method for calibrating the plane and the sphere, the simulation experiment in the present disclosure is also divided into two parts: the simulation of a spatial pose linear calibration algorithm and the simulation of a zero reference position nonlinear calibration algorithm.

In order to make the simulation experiment simulate an actual on-machine inspection process as much as possible, it is necessary to add Gaussian noise to the three-axis coordinates of X, Y and Z of the contact probe corresponding to the detection point and the measurement value d of the chromatic confocal probe according to the positioning error of the coordinate measuring machine and the measurement error of the chromatic confocal probe in an on-machine inspection system.

Manufacturing practice demonstrates that the distribution of positioning errors of a machine tool guide conforms to the statistical law of normal distribution. The average value of the normal distribution reflects the systematic error part in the positioning errors of guide rail. The standard deviation reflects the random error part in the positioning error of the guide rail, where the positional accuracy A of the guide rail can be expressed as:

$$A = \mu \pm 3\sigma; \quad (20)$$

the repeatability B of the guide rail can be expressed as:

$$R = 6\sigma. \quad (21)$$

Specifically, for the coordinate measuring machine selected in the present disclosure, the positional accuracy of three axes of X, Y and Z is up to 0.0027 mm, and the repeatability is up to 0.003 mm. According to formula 18 and formula 19, as well as the positional accuracy and repeatability of the guide rail of the coordinate measuring machine, the average value of Gaussian noise in coordinates of three axes of X, Y and Z is set as 0.0012 mm, and the standard deviation is set as 0.0005 mm. The probabilities of positive and negative values of the two high-speed noises are both 50%. The chromatic confocal probe selected in the present disclosure has good measurement precision in the range of inclination of 10 degrees, and the measurement error is within ±0.0003 mm. Here, the average Gaussian noises of the measurement value d of the chromatic confocal probe are set as 0 mm, and the standard deviation is set as 0.00015 mm.

The vectors in the light output direction of the chromatic confocal probe are $\alpha=28.44°$, $\beta=61.84°$, $\gamma=86.30°$, the zero reference position is $(\delta x, \delta y, \delta z)=(12.75, 11.02, 10.77)$, and the diameter of the high-precision standard sphere is $D=25$ mm. It is assumed that the measurement value of the chromatic confocal probe is a random value between 60 mm and 70 mm. In actual measurement, the measuring points of the sensor are on the surfaces of the standard plane and the spherical surface, so that the random sampling points are on the spherical surface and the plane.

Figure 4:
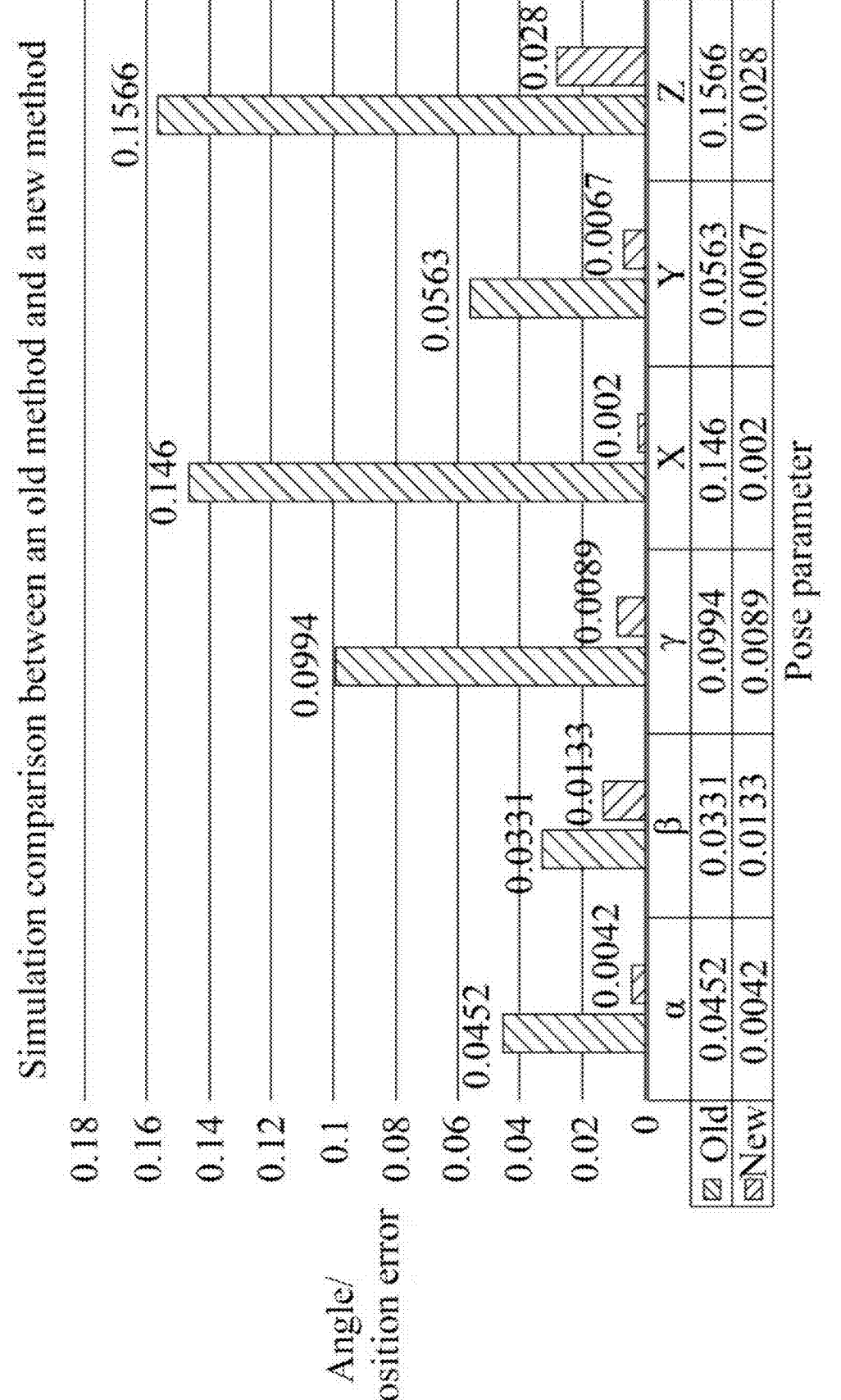
FIG. 4 is a diagram showing comparison of simulation error results of different methods in simulation experiments according to an embodiment of the present disclosure.

Then, the method proposed in the present disclosure and the traditional spherical iteration method are used to calibrate the probe with respect to the generated original data separately, and the results are shown in FIG. 4.

Then, the calibrated three-dimensional space angle is synthesized into a vector in one direction, and the position information at the calibrated position is synthesized into a distance. The synthesis result is shown in FIG. 5.

Figure 5:
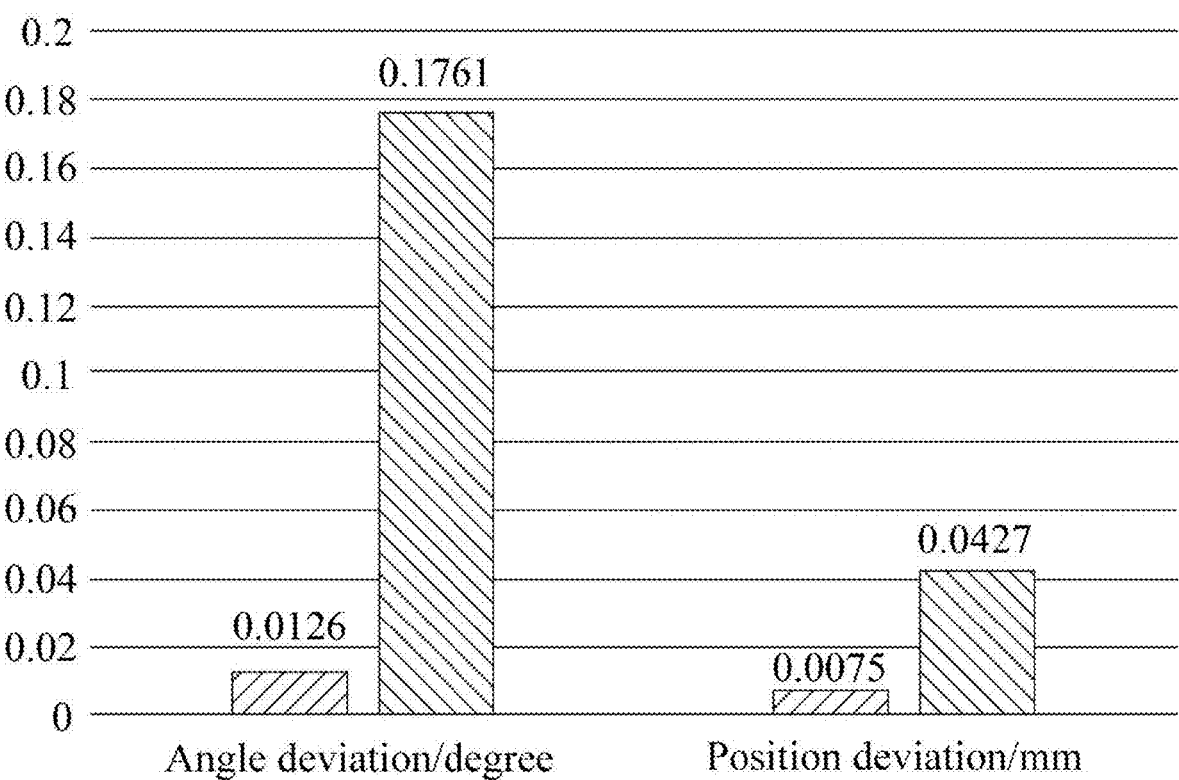
FIG. 5 is a diagram showing comparison of results after synthesizing simulation errors in simulation experiments according to an embodiment of the present disclosure.

It can be seen intuitively from the above-mentioned FIG. 4 and FIG. 5 that the error of the method for calibrating the spatial pose and position of the chromatic confocal probe with combined planar and spherical constraints in the present disclosure is far less than that of the traditional spherical iteration calibration method. Here, the traditional spherical iteration calibration method refers to the method of calibrating the spatial pose and the zero position of the chromatic confocal probe together.

Specifically, in terms of angle synthesis errors, the error of the method in the present disclosure is 0.0126°, the error of the spherical iteration method is 0.1761°, and the precision is improved by 92.8%.

In terms of position synthesis errors, the error in the method of the present disclosure is $(\delta x, \delta y, \delta z)=(0.002, 0.007, 0.028)$, and the synthesis result is $\Delta d=0.0075$. The error of the spherical iteration method is $(\delta x, \delta y, \delta z)=(0.146, 0.056, 0.157)$. The synthetic result is $\Delta d=0.0427$, and the accuracy is improved by 82.4%.

In the simulation experiment, the calibration errors of the unit vector of the optical axis in three dimensions are all within +0.005 mm, and the calibration errors of the zero reference position vector in three dimensions are all within +0.03 mm. To sum up, the calibration errors of the above simulation experiment meets the actual measurement requirements. The method for calibrating the spatial pose and position of the chromatic confocal probe with combined planar and spherical constraints in the present disclosure is fully feasible and effective.

Furthermore, the method for calibrating the spatial pose and position of the chromatic confocal probe with combined constraint of plane sphere in the present disclosure can also be verified by experiments.

Specifically, aiming at the method for calibrating the spatial pose and position of the chromatic confocal probe with combined planar and spherical constraints in the present disclosure, the present disclosure designs a calibration experiment of on-machine inspection. In this experiment, a bridge coordinate measuring machine of ExplorerClassic05.07.05 from Hexagon Company is used as the coordinate measuring machine, and the precision is 2.7±3.5 L/1000 μm. The optical sensor is a self-developed chromatic confocal probe in which the measuring range is 4 mm, and the nominal diameter of the standard sphere is 15.0830 mm.

In the experiment, a standard sphere and three standard planes are taken as the measurement objects, which are value of the chromatic confocal probe; and using a chromatic confocal probe to measure at least six points on a standard spherical surface, and recording the coordinates of the contact probe and the measured displacement value of the chromatic confocal probe;

(6) completing the acquisition of data used for calibration;

(7) using a chromatic confocal probe to measure the standard sphere and the standard plane, separately, and recording the coordinates of the contact probe and the measured displacement value of the chromatic confocal probe for verifying precision.

Five groups are calibrated by using the method for calibrating the spatial pose and position of the chromatic confocal probe with combined planar and spherical constraints in the present disclosure, and the results are as follows.

TABLE 1

| a plurality groups of calibration results | | | | | | |
|---|---|---|---|---|---|---|
| Calibration sequence number | $\delta x/mm$ | $\delta y/mm$ | $\delta z/mm$ | $\alpha/°$ | $\beta/°$ | $\gamma/°$ |
| 1 | −4.5793 | 20.6884 | −81.2247 | 89.5477 | 179.4038 | 90.4041 |
| 2 | −4.5879 | 20.6883 | −81.2159 | 89.5600 | 179.4430 | 90.4042 |
| 3 | −4.5852 | 20.6884 | −81.2187 | 89.5188 | 179.4265 | 90.3401 |
| 4 | −4.5759 | 20.6885 | −81.2280 | 89.5228 | 179.4018 | 90.4277 |
| 5 | −4.5903 | 20.6882 | −81.2133 | 89.5082 | 179.4682 | 90.4619 |
| Average value | −4.5837 | 20.6884 | −81.2201 | 89.5315 | 179.4287 | 90.4076 |
| Standard deviation | 0.0060 | 0.0001 | 0.0061 | 0.0215 | 0.0279 | 0.0445 |
| Range | 0.0144 | 0.0004 | 0.0147 | 0.0518 | 0.0664 | 0.1218 | subjected to the chromatic confocal measurement and contact measurement, separately. The measuring method includes the following steps:

(1) using a clamp to clamp the chromatic confocal probe, and mounting a chromatic confocal probe at a three-axis coordinate contact probe (for example, a CMM touch-trigger probe);

(2) placing two standard balls on a workbench of the coordinate measuring machine, where one ball is taken as a reference ball, a center of the ball is taken as an origin of a reference coordinate system, and the other ball is taken as a measurement ball; and placing three gage blocks on the workbench as standard planes for calibration;

(3) using the contact probe to measure the reference ball, and obtaining the coordinate values of the center of the reference ball in the machine coordinate system corresponding to the contact probe, so that the measurement results of the contact probe can be transformed into the reference coordinate system, where the contact probe is mounted in the Z-axis direction of the coordinate measuring machine;

(4) using the contact probe to measure points on the measurement ball, and using a least square method to fit the obtained measuring data into a spherical surface to obtain the radius and center coordinates of the measurement ball; and using the contact probe to take points on three standard planes to obtain the plane equations of the three planes;

(5) using a chromatic confocal probe to measure at least two points on each plane, and recording the coordinates of the contact probe and the measured displacement Five groups of calibrated data are used to verify the precision of planeness and spherical fitting errors, separately, and the results are as follows.

TABLE 2

| verification of calibration precision (planeness) | | |
|---|---|---|
| Sequence number/ planar fitting error | Method of the present disclosure/μm | Spherical method only/μm |
| 1 | 1.0852 | 5.9994 |
| 2 | 1.0853 | 4.9018 |
| 3 | 1.0854 | 4.0170 |
| 4 | 1.0857 | 4.2294 |
| 5 | 1.0849 | 5.0047 |
| Range | 0.0008 | 1.9824 |

TABLE 3

| verification of calibration precision (spherical fitting error) | | |
|---|---|---|
| Sequence number/ spherical fitting error | Method of the present disclosure/μm | Spherical method only/μm |
| 1 | 7.6503 | 13.8471 |
| 2 | 7.6367 | 13.5838 |
| 3 | 7.7042 | 15.1594 |
| 4 | 7.6409 | 14.8266 |
| 5 | 7.6815 | 14.0710 |
| Range | 0.0675 | 1.5756 |

Through the fitting errors in terms of planeness and the spherical surface in the above Table 2 and Table 3, it can be seen that the error of the method for calibrating the spatial and pose position of the chromatic confocal probe with combined planar and spherical constraints in the present disclosure is far less than the calibration error of the spherical method only, and the calibration method in the present disclosure can greatly improve the calibration precision.

Those skilled in the art can easily understand that the above is only the preferred embodiment of the present disclosure, which is not used to limit the present disclosure. Any modification, equivalent substitution and improvement made within the spirit and principle of the present disclosure should be included in the protection scope of the present disclosure.

What is claimed is:

1. A method for calibrating a spatial pose of a chromatic confocal probe and position of the chromatic confocal probe with combined planar and spherical constraints, wherein calibration is carried out by a coordinate measuring machine, a contact probe and the chromatic confocal probe are provided on the coordinate measuring machine, the contact probe is a standard part provided on the coordinate measuring machine, and the contact probe and the chromatic confocal probe are synchronously displaced in a three-dimensional direction; and the method for calibrating the spatial pose of the chromatic confocal probe and the position of the chromatic confocal probe with the combined planar and spherical constraints comprises:

step S1, establishing a machine coordinate system, a contact probe coordinate system, a chromatic confocal probe coordinate system, and a workpiece coordinate system;

step S2, transforming first position information obtained in the contact probe coordinate system by the contact probe upon a measurement by the chromatic confocal probe, into coordinate information in the machine coordinate system; and in consideration of a mounting inclination angle of the chromatic confocal probe, transforming second position information of a point on a workpiece measured in the chromatic confocal probe coordinate system by the chromatic confocal probe into coordinate information in the machine coordinate system;

step S3, acquiring coordinate information of two points in one plane of three calibration planes by moving the chromatic confocal probe to measure second position information of the two points respectively, and establishing a linear equation based on the coordinate information of two points in the one plane of the three calibration planes; acquiring coordinate information of two points in each of other two calibration planes, to establish other two linear equation, thereby forming a system of linear equations, wherein the system of linear equations comprises the spatial pose of the chromatic confocal probe; and solving the system of linear equations to obtain the spatial pose of the chromatic confocal probe;

step S4, acquiring coordinate information of at least three points on a spherical surface by moving the chromatic confocal probe to measure second position information of the at least three points respectively; substituting the coordinate information of the at least three points into a sphere equation, establishing an overdetermined system of equations, wherein the overdetermined system of equations comprises the spatial pose of the chromatic confocal probe and zero reference position of the chromatic confocal probe, and substituting the spatial pose of the chromatic confocal probe in the step S3 into the overdetermined system of equations for solution to obtain the zero reference position of the chromatic confocal probe;

placing a target workpiece on a workbench of the coordinate measuring machine, measuring second position information of a point on the target workpiece by using the chromatic confocal probe, and determining coordinate information of the point on the target workpiece in the machine coordinate system based on the spatial pose of the chromatic confocal probe obtained in the step S3, the zero reference position of the chromatic confocal probe obtained in the step S4, a first position information by the contact probe upon a measurement of the point on the target workpiece by the chromatic confocal probe and the second position information by the chromatic confocal probe.

2. The method for calibrating the spatial pose of the chromatic confocal probe and the position of the chromatic confocal probe with the combined planar and spherical constraints according to claim 1, wherein in the step S2, the contact probe and the chromatic confocal probe are synchronously displaced, and coordinate information when the contact probe performs measurement is set as a reference value; and the first position coordinate information on the workpiece measured by the contact probe is substituted into the point on the workpiece measured by the chromatic confocal probe to obtain coordinate information of the point on the workpiece measured by the chromatic confocal probe in the machine coordinate system.

3. The method for calibrating the spatial pose of the chromatic confocal probe and the position of the chromatic confocal probe with the combined planar and spherical constraints according to claim 2, wherein the coordinate information of the point on the workpiece measured by the chromatic confocal probe in the machine coordinate system in the step S2 is acquired as follows:

causing directions of three axes of X, Y, and Z in the machine coordinate system, the contact probe coordinate system, and the chromatic confocal probe coordinate system to be parallel to and consistent with each other, respectively;

establishing homogeneous transformation matrices from the machine coordinate system to an X-axis coordinate system, from the X-axis coordinate system to a Y-axis coordinate system, and from the Y-axis coordinate system to a Z-axis coordinate system, respectively;

setting a direction vector of the contact probe with respect to an origin of the machine coordinate system as $\overrightarrow{O_C O_T}=(\delta x, \delta y, \delta z)$ to obtain a homogeneous transformation matrix from the Z-axis coordinate system to the chromatic confocal probe coordinate system;

setting the second position information of the chromatic confocal probe as d to obtain a homogeneous transformation matrix from the chromatic confocal probe coordinate system to the workpiece coordinate system;

obtaining a homogeneous transformation matrix from the machine coordinate system to the workpiece coordinate system according to the homogeneous transformation matrix from the machine coordinate system to the X-axis coordinate system, the homogeneous transformation matrix from the X-axis coordinate system to the Y-axis coordinate system, the homogeneous transformation matrix from the Y-axis coordinate system to the Z-axis coordinate system, the homogeneous transformation matrix from the Z-axis coordinate system to the chromatic confocal probe coordinate system, and the homogeneous transformation matrix from the chromatic confocal probe coordinate system to the workpiece coordinate system;

obtaining a theoretical coordinate of the point on the workpiece in the machine coordinate system according to a homogeneous transformation principle; and setting included angles between an optical axis of the chromatic confocal probe and three coordinate axes to obtain coordinates of the point on the workpiece measured by the chromatic confocal probe in the machine coordinate system.

4. The method for calibrating the spatial pose of the chromatic confocal probe and the position of the chromatic confocal probe with the combined planar and spherical constraints according to claim 3, wherein forming the system of linear equations in the step S3 comprises:

step S301, setting a calibration plane on the coordinate measuring machine, wherein the calibration plane is not parallel to each of X-axis, Y-axis, and Z-axis in the machine coordinate system, and establishing a plane equation, wherein the plane equation is established with four points in the calibration plane;

step S302, obtaining coordinate information of a first point on the calibration plane by using the chromatic confocal probe, moving the chromatic confocal probe to obtain coordinate information of a second point in the calibration plane, substituting the coordinate information of the first point and the coordinate information of the second point into the plane equation and subtracting the information of the first point and the information of the second point to obtain an equation with the zero reference position eliminated;

step S303, selecting other two calibration planes, and repeating the step S302 to obtain other two equations, wherein in each of the other two equations, information of two points is subtracted; and step S304, combining the equation in the step S302 and the other two equations in the step S303 to establish the system of linear equations, and solving the system of linear equations to obtain the spatial pose of the chromatic confocal probe.

5. The method for calibrating the spatial pose of the chromatic confocal probe and the position of the chromatic confocal probe with the combined planar and spherical constraints according to claim 4, wherein the theoretical coordinate of the point on the workpiece in the machine coordinate system is calculated as follows:

expressing the homogeneous transformation matrix from the machine coordinate system to the X-axis coordinate system, the homogeneous transformation matrix from the X-axis coordinate system to the Y-axis coordinate system, and the homogeneous transformation matrix from the Y-axis coordinate system to the Z-axis coordinate system are respectively as follows:

$$
{}_{X}^{B}T^{i} = \begin{bmatrix} 1 & 0 & 0 & x_m \\ 0 & 1 & 0 & 0 \\ 0 & 0 & 1 & 0 \\ 0 & 0 & 0 & 1 \end{bmatrix}, \tag{1}
$$

$$
{}_{Y}^{X}T^{i} = \begin{bmatrix} 1 & 0 & 0 & 0 \\ 0 & 1 & 0 & y_m \\ 0 & 0 & 1 & 0 \\ 0 & 0 & 0 & 1 \end{bmatrix},
$$

$$
{}_{Z}^{Y}T^{i} = \begin{bmatrix} 1 & 0 & 0 & 0 \\ 0 & 1 & 0 & 0 \\ 0 & 0 & 1 & z_m \\ 0 & 0 & 0 & 1 \end{bmatrix};
$$

where $X_m$, $Y_m$ and $z_m$ are first position information of the contact probe;

setting the direction vector of the contact probe with respect to the origin of the machine coordinate system as $\overrightarrow{O_C O_I} = (\delta x, \delta y, \delta z)$ to obtain the homogeneous transformation matrix from the Z-axis coordinate system to the chromatic confocal probe coordinate system as follows:

$$
{}_{S}^{Z}T^{i} = \begin{bmatrix} 1 & 0 & 0 & \delta x \\ 0 & 1 & 0 & \delta y \\ 0 & 0 & 1 & \delta z \\ 0 & 0 & 0 & 1 \end{bmatrix}; \tag{2}
$$

setting the second position information of the chromatic confocal probe as d to obtain the homogeneous transformation matrix from the chromatic confocal probe coordinate system to the workpiece coordinate system as follows:

$$
{}_{B}^{S}T^{i} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}; \tag{3}
$$

obtaining the homogeneous transformation matrix from the machine coordinate system to the workpiece coordinate system as follows:

$$
{}_{W}^{B}T^{i} = {}_{X}^{B}T^{i} \cdot {}_{Y}^{X}T^{i} \cdot {}_{Z}^{Y}T^{i} \cdot {}_{S}^{Z}T^{i} \cdot {}_{W}^{S}T^{i} = \begin{bmatrix} 1 & 0 & 0 & x_m + \delta x \\ 0 & 1 & 0 & y_m + \delta y + d \\ 0 & 0 & 1 & z_m + \delta z \\ 0 & 0 & 0 & 1 \end{bmatrix}; \tag{4}
$$

and obtaining the coordinates of the point on the workpiece in the machine coordinate system by using a homogeneous coordinate transformation principle, as follows:

$$
P_B = (x_m + \delta x, y_m + \delta y + d, z_m + \delta z) \tag{5}.
$$

6. The method for calibrating the spatial pose of the chromatic confocal probe and the position of the chromatic confocal probe with the combined planar and spherical constraints according to claim 5, wherein the coordinates of the point on the workpiece measured by the chromatic confocal probe in the machine coordinate system is calculated as follows:

setting the included angles between the optical axis of the chromatic confocal probe and the three coordinate axes as $\alpha$, $\beta$, $\gamma$, and expressing a unit direction vector of the optical axis in the chromatic confocal probe coordinate system as $$
\vec{l} = (\cos\alpha, \cos\beta, \cos\gamma) = (a, b, c)
$$

substituting the unit direction vector into the homogeneous transformation matrix from the machine coordinate system to the workpiece coordinate system:

$$
{}_{W}^{B}T^{i} = {}_{X}^{B}T^{i} \cdot {}_{Y}^{X}T^{i} \cdot {}_{Z}^{Y}T^{i} \cdot {}_{X}^{B}T^{i} \cdot {}_{W}^{S}T^{i} = \begin{bmatrix} 1 & 0 & 0 & x_m + \delta x + d \cdot a \\ 0 & 1 & 0 & y_m + \delta y + d \cdot b \\ 0 & 0 & 1 & z_m + \delta z + d \cdot c \\ 0 & 0 & 0 & 1 \end{bmatrix}; \tag{6}
$$

and obtaining the coordinates of the point on the workpiece measured by the chromatic confocal probe in the machine coordinate system by using the homogeneous coordinate transformation principle:

$$P_B = (X_m + \delta x + d \cdot a, y_m + \delta y + d \cdot b, z_m + \delta z + d \cdot c) \qquad (7).$$

7. The method for calibrating the spatial pose of the chromatic confocal probe and the position of the chromatic confocal probe with the combined planar and spherical constraints according to claim 6, wherein establishing the system of linear equations in the step S3 is as follows:

expressing the plane equation as follows:

$$Ax + By + Cz + D = 0; \qquad (8)$$

where A, B, C, and D are parameters of spatial positions in the one calibration plane, respectively;

denoting second position information measured by the chromatic confocal probe as $d_1$, first position information measured by the contact probe as $x_1$, $y_1$, and $z_1$, and obtaining first point coordinates of $(x_1 + \delta x + d_1 \cdot a, y_1 + \delta y + d_1 \cdot b, z_1 + \delta z + d_1 \cdot c)$ according to formula (7);

substituting the first point coordinates into the plane equation to obtain formula (9):

$$A_1 \cdot (x_1 + \delta x + d_1 \cdot a) + B_1 \cdot (y_1 + \delta y + d_1 \cdot b) + C_1 \cdot (z_1 + \delta z + d_1 \cdot c) + D_1 = 0; \qquad (9)$$

moving the chromatic confocal probe to measure the second point on the one calibration plane, wherein the second point is not the same as the first point, denoting second position information of the second point measured by the chromatic confocal probe as $d_2$, first position information measured by the contact probe as $x_2$, $y_2$ and $z_2$ to obtain second point coordinates $(x_2 + \delta x + d_2 \cdot a, y_2 + \delta y + d_2 \cdot b, z_2 + \delta z + d_2 \cdot c)$, and substituting the second point coordinates into the plane equation to obtain formula (10):

$$A_1 \cdot (x_2 + \delta x + d_2 \cdot a) + B_1 \cdot (y_2 + \delta y + d_2 \cdot b) + C_1 \cdot (z_2 + \delta z + d_2 \cdot c) + D_1 = 0; \qquad (10)$$

subtracting formula (10) from formula (9) obtain:

$$[A_1 \cdot (d_1 - d_2) \quad B_1 \cdot (d_1 - d_2) \quad C_1 \cdot (d_1 - d_2)] \cdot \begin{bmatrix} a \\ b \\ c \end{bmatrix} = \qquad (11)$$
$$[A_1 \cdot (x_1 - x_2) + B_1 \cdot (x_1 - x_2) + C_1 \cdot (x_1 - x_2)].$$

8. The method for calibrating the spatial pose of the chromatic confocal probe and the position of the chromatic confocal probe with the combined planar and spherical constraints according to claim 7, wherein in the step S303, the other two equations from the coordinate information of two points in each of the other two calibration planes are as follows:

$$[A_2 \cdot (d_3 - d_4) \quad B_2 \cdot (d_3 - d_4) \quad C_2 \cdot (d_3 - d_4)] \cdot \begin{bmatrix} a \\ b \\ c \end{bmatrix} = \qquad (12)$$
$$[A_2 \cdot (x_3 - x_4) + B_2 \cdot (x_3 - x_4) + C_2 \cdot (x_3 - x_4)];$$

$$[A_3 \cdot (d_5 - d_6) \quad B_3 \cdot (d_5 - d_6) \quad C_3 \cdot (d_5 - d_6)] \cdot \begin{bmatrix} a \\ b \\ c \end{bmatrix} = \qquad (13)$$
$$[A_3 \cdot (x_5 - x_6) + B_3 \cdot (x_3 - x_4) + C_3 \cdot (x_5 - x_6)];$$

and formula (11), formula (12), and formula (13) are combined to obtain the system of linear equations:

$$\begin{bmatrix} A_1(d_1 - d_2) & B_1 \cdot (d_1 - d_2) & C_1 \cdot (d_1 - d_2) \\ A_2 \cdot (d_3 - d_4) & B_2 \cdot (d_3 - d_4) & C_2 \cdot (d_3 - d_4) \\ A_3 \cdot (d_5 - d_6) & B_3 \cdot (d_5 - d_6) & C_3 \cdot (d_5 - d_6) \end{bmatrix} \cdot \begin{bmatrix} a \\ b \\ c \end{bmatrix} = \qquad (14)$$

$$\begin{bmatrix} A_1 \cdot (x_1 - x_2) + B_1 \cdot (x_1 - x_2) + C_1 \cdot (x_1 - x_2) \\ A_2 \cdot (x_3 - x_4) + B_2 \cdot (x_3 - x_4) + C_2 \cdot (x_3 - x_4) \\ A_3 \cdot (x_5 - x_6) + B_3 \cdot (x_5 - x_6) + C_3 \cdot (x_5 - x_6) \end{bmatrix}.$$

9. The method for calibrating the spatial pose of the chromatic confocal probe and the position of the chromatic confocal probe with the combined planar and spherical constraints according to claim 1, wherein establishing the overdetermined system of equations in the step S4 is as follows:

setting coordinates of a spherical center, a point O, of the spherical surface in the machine coordinate system as $(x_0, Y_0, z_0)$, setting the included angles between the optical axis of the chromatic confocal probe and the three coordinate axes of the machine coordinate system as $\alpha$, $\beta$, $\gamma$, and setting a unit direction vector of the optical axis as $$\vec{l} = (\cos\alpha, \cos\beta, \cos\gamma) = (a, b, c);$$

setting second position information measured by the chromatic confocal probe as $d_7$, first position information of the contact probe as $x_7$, $y_7$ and $z_7$, and coordinates of a point S on the spherical surface in the machine coordinate system as $S^C$:

$$(x_7 + \delta x + d_7 \cdot a, y_7 + \delta y + d_7 \cdot b, z_7 + \delta z + d_7 \cdot c);$$

substituting the coordinates of the point S and coordinates of the point O into the sphere equation, wherein the point S is located on the spherical surface, and $$\overrightarrow{SO} = R: \ f_1 = (x_7 + \delta x + d_7 \cdot a - X_0)^2 + \qquad (15)$$
$$(y_7 + \delta y + d_7 \cdot b - Y_0)^2 + (z_7 + \delta z + d_7 \cdot c - Z_0)^2 - R^2 = 0;$$

measuring a point T on the spherical surface by using the chromatic confocal probe, to obtain coordinates of the point T in the machine coordinate system as $T^C$:

$$(x_8 + \delta x + d_8 \cdot a, y_8 + \delta y + d_8 \cdot b, z_8 + \delta z + d_8 \cdot c);$$

substituting the coordinates of the point T and the coordinates of the point O into the sphere equation, wherein the point T is located on the spherical surface and $$\overrightarrow{TO} = R: \ f_2 = (x_8 + \delta x + d_8 \cdot a - X_0)^2 + \qquad (16)$$
$$\left(y_8 + \delta y + d_8 \cdot b - Y^0\right)^2 + (z_8 + \delta z + d_8 \cdot c - Z_0)^2 - R^2 = 0;$$

measuring coordinate information of a plurality of points on the spherical surface by using the chromatic confocal probe, assuming second position information of the chromatic confocal probe as $d_i$, and first position information of the contact probe as $x_i$, $y_i$, and $z_i$ and obtaining the overdetermined system of equations as follows:

$$\begin{cases} (x_7 + \delta x + d_2 \cdot a - X_0)^2 + (y_7 + \delta y + d_2 \cdot b - Y_0)^2 + (z_7 + \delta z + d_2 \cdot c - Z_0)^2 - r^2 = 0 \\ (x_7 + \delta x + d_2 \cdot a - X_0)^2 + (y_7 + \delta y + d_2 \cdot b - Y_0)^2 + (z_7 + \delta z + d_2 \cdot c - Z_0)^2 - r^2 = 0 \\ \vdots \\ \vdots \\ (x_7 + \delta x + d_2 \cdot a - X_0)^2 + (y_7 + \delta y + d_2 \cdot b - Y_0)^2 + (z_7 + \delta z + d_2 \cdot c - Z_0)^2 - r^2 = 0 \end{cases} \quad (17)$$

and
wherein a constraint condition of formula (17) is as
follows:

$$\begin{cases} a^2 + b^2 + c^2 = 1 \\ -1 \le a, b, c \le 1 \end{cases} \quad (18)$$

10. The method for calibrating the spatial pose of the chromatic confocal probe and the position of the chromatic confocal probe with the combined planar and spherical constraints according to claim 9, wherein formula (17) is solved by a Levenberg-Marquardt (LM) iterative algorithm to obtain the zero reference position of the chromatic confocal probe.

\* \* \* \* \*